(12) United States Patent
Liu et al.

(10) Patent No.: US 12,423,114 B2
(45) Date of Patent: Sep. 23, 2025

(54) DISC LOADING CONTROL METHOD, APPARATUS, AND DEVICE, AND READABLE STORAGE MEDIUM

(71) Applicant: SUZHOU METABRAIN INTELLIGENT TECHNOLOGY CO., LTD., Jiangsu (CN)

(72) Inventors: Jun Liu, Jiangsu (CN); Xufang Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/567,652

(22) PCT Filed: Jun. 19, 2022

(86) PCT No.: PCT/CN2022/099647
§ 371 (c)(1),
(2) Date: Dec. 6, 2023

(87) PCT Pub. No.: WO2023/123896
PCT Pub. Date: Jul. 6, 2023

(65) Prior Publication Data
US 2024/0272912 A1 Aug. 15, 2024

(30) Foreign Application Priority Data
Dec. 28, 2021 (CN) .......................... 202111616489.1

(51) Int. Cl.
*G06F 9/4401* (2018.01)
*G06F 8/61* (2018.01)

(52) U.S. Cl.
CPC .............. *G06F 9/4411* (2013.01); *G06F 8/61* (2013.01); *G06F 9/4406* (2013.01)

(58) Field of Classification Search
CPC ......... G06F 9/4411; G06F 8/61; G06F 9/4406
See application file for complete search history.

(56) References Cited

U.S. PATENT DOCUMENTS 10,990,415 B2 * 4/2021 He .................... G06F 9/44505
2020/0210163 A1 * 7/2020 Lang ........................ G06F 8/61

FOREIGN PATENT DOCUMENTS

| CN | 101819508 A | 9/2010 |
|---|---|---|
| CN | 104461402 A | 3/2015 |

(Continued)

OTHER PUBLICATIONS

Lefroy Payton. "The rhel7 kernel loading sequence changes, causing drive letters to be out of order." URL: https://bbs.csdn.net/topics/392694217?page=1. Jun. 11, 2019.

*Primary Examiner* — Tammara R Peyton
(74) *Attorney, Agent, or Firm* — IPro, PLLC

(57) ABSTRACT

The present application discloses a method for controlling magnetic-disk loading, an apparatus, a device and a readable storage medium. The method includes: obtaining magnetic-disk-configuration information of a server; when it is determined according to the magnetic-disk-configuration information that the server includes a plurality of magnetic-disk drives, configuring, in an installation configuration file of an operating system, a loading sequence of the magnetic-disk drives and a loading sequence of magnetic disks that are managed by each of the magnetic-disk drives; or when it is determined according to the magnetic-disk-configuration information that the server includes a single magnetic-disk drive, configuring, in the installation configuration file of the operating system, a loading sequence of magnetic disks that are managed by the magnetic-disk drive; and according to a configured installation configuration file of the operating (Continued)

system, installing the operating system into the server, to fix the configured loading sequence into the operating system.

15 Claims, 3 Drawing Sheets

(56) References Cited

FOREIGN PATENT DOCUMENTS

| | | | |
|---|---|---|---|
| CN | 105589690 A | 5/2016 |
| CN | 106020914 A | 10/2016 |
| CN | 110187843 A | 8/2019 |
| CN | 112000532 A | 11/2020 |
| CN | 113986367 A | 1/2022 |

* cited by examiner

DISC LOADING CONTROL METHOD, APPARATUS, AND DEVICE, AND READABLE STORAGE MEDIUM

CROSS REFERENCE TO RELEVANT APPLICATIONS

The present application claims the priority of the Chinese patent application filed on Dec. 28, 2021 before the Chinese Patent Office with the application number of 202111616489.1 and the title of "DISC LOADING CONTROL METHOD, APPARATUS, AND DEVICE, AND READABLE STORAGE MEDIUM", which is incorporated herein in its entirety by reference.

TECHNICAL FIELD

The present application relates to the technical field of servers and, more particularly, to a method for controlling magnetic-disk loading, an apparatus, a device and a readable storage medium.

BACKGROUND

In the operation and maintenance management of servers, each time the operating system is restarted, the names of the magnetic-disk devices might change. That is because the sequence of the loading of the magnetic-disk drives and the sequence of the scanning of the magnetic disk are not constant. Such phenomenon of magnetic-disk out-of-order is deemed as a normal phenomenon in Linux, and the Linux does not have a constant drive loading sequence. However, the phenomenon of the magnetic-disk out-of-order is inconvenient for distinguishing the magnetic-disk devices.

In order to solve the problem of the magnetic-disk out-of-order, currently, generally, when the problem of the magnetic-disk out-of-order occurs in the operation and the maintenance of the operating system of the server, by using a method of excluding the magnetic-disk drive module from initramfs, by configuring dracut (an utility program maintaining the initramfs), the magnetic-disk drive that is required to be loaded in a delaying mode is ignored, so that the magnetic-disk drive module that still exists in the initramfs obtains a prior device name. However, the inventor realizes that such a mode is a solution for treatment after the operating system is used and the problem of the magnetic-disk out-of-order occurs, and the problem of the magnetic-disk out-of-order cannot be solved.

SUMMARY

In order to achieve the above objects, according to the first aspect, a method for controlling magnetic-disk loading is provided in the present application, wherein the method includes:

obtaining magnetic-disk-configuration information of a server;

when it is determined according to the magnetic-disk-configuration information that the server includes a plurality of magnetic-disk drives, configuring, in an installation configuration file of an operating system, a loading sequence of the magnetic-disk drives and a loading sequence of magnetic disks that are managed by each of the magnetic-disk drives; or when it is determined according to the magnetic-disk-configuration information that the server includes a single magnetic-disk drive, configuring, in the installation configuration file of the operating system, a loading sequence of magnetic disks that are managed by the magnetic-disk drive; and according to a configured installation configuration file of the operating system, installing the operating system into the server, to fix the configured loading sequence into the operating system.

In an embodiment, the step of configuring, in the installation configuration file of the operating system, the loading sequence of the magnetic-disk drives and the loading sequence of the magnetic disks that are managed by each of the magnetic-disk drives includes:

configuring, in a kickstart configuration file, the loading sequence of the magnetic-disk drives and the loading sequence of the magnetic disks that are managed by each of the magnetic-disk drives; and the step of configuring, in the installation configuration file of the operating system, the loading sequence of the magnetic disks that are managed by the magnetic-disk drive includes:

configuring, in the kickstart configuration file, the loading sequence of the magnetic disks that are managed by the magnetic-disk drive.

In an embodiment, before the step of configuring, in the kickstart configuration file, the loading sequence, the method further includes:

when it is determined according to the magnetic-disk-configuration information that the server includes the plurality of magnetic-disk drives, configuring, in a default configuration file, the loading sequence of the magnetic-disk drives and the loading sequence of the magnetic disks that are managed by each of the magnetic-disk drives;

when it is determined according to the magnetic-disk-configuration information that the server includes the single magnetic-disk drive, configuring, in the default configuration file, the loading sequence of the magnetic disks that are managed by the magnetic-disk drive.

In an embodiment, the step of configuring, in the default configuration file, the loading sequence of the magnetic-disk drives and the loading sequence of the magnetic disks that are managed by each of the magnetic-disk drives includes:

controlling, in the default configuration file, by using a modprobe.blacklist parameter, the magnetic-disk drive that is loaded in a delaying mode, and controlling, by using scsi_mod.scan=sync, the loading sequence of the magnetic disks that are managed by a same magnetic-disk drive; and the step of configuring, in the default configuration file, the loading sequence of the magnetic disks that are managed by the magnetic-disk drive includes:

controlling, in the default configuration file, by using the scsi_mod.scan=sync, the loading sequence of the magnetic disks that are managed by the magnetic-disk drive.

In an embodiment, the step of configuring, in the kickstart configuration file, the loading sequence of the magnetic-disk drives and the loading sequence of the magnetic disks that are managed by each of the magnetic-disk drives includes:

when the operating system uses an upstart starting-up manager, controlling, in the kickstart configuration file, by using a rdloaddriver parameter, the loading sequence of the magnetic-disk drives, and controlling, by using the scsi_mod.scan=sync, the loading sequence of the magnetic disks that are managed by the same magnetic-disk drive.

In an embodiment, after the step of, according to the configured installation configuration file of the operating system, installing the operating system into the server, the method further includes:

when the operating system uses a systemd starting-up manager, adding into a % post part of the kickstart configuration file a removing instruction of removing the magnetic-disk drive that is loaded in the delaying mode that is disposed in the default configuration file.

In an embodiment, the step of configuring, in the kickstart configuration file, the loading sequence of the magnetic disks that are managed by the magnetic-disk drive includes:

controlling, in the kickstart configuration file, by using the scsi_mod.scan=sync, the loading sequence of the magnetic disks that are managed by the magnetic-disk drive.

According to the second aspect, an apparatus for controlling the magnetic-disk loading is provided by the present application, wherein the apparatus includes:

an obtaining module configured for obtaining magnetic-disk-configuration information of a server;

a first configuring module configured for, when it is determined according to the magnetic-disk-configuration information that the server includes a plurality of magnetic-disk drives, configuring, in an installation configuration file of an operating system, a loading sequence of the magnetic-disk drives and a loading sequence of magnetic disks that are managed by each of the magnetic-disk drives;

a second configuring module configured for, when it is determined according to the magnetic-disk-configuration information that the server includes a single magnetic-disk drive, configuring, in the installation configuration file of the operating system, a loading sequence of magnetic disks that are managed by the magnetic-disk drive; and an installing module configured for, according to a configured installation configuration file of the operating system, installing the operating system into the server, to fix the configured loading sequence into the operating system.

According to the third aspect, a device for controlling the magnetic-disk loading is provided by the present application, wherein the device includes:

a memory configured for storing a computer-readable instruction; and one or more processors configured for, when executing the computer-readable instruction, implementing the steps of the method for controlling the magnetic-disk loading according to any one of the above embodiments.

According to the fourth aspect, one or more non-volatile computer-readable storage mediums storing a computer-readable instruction are provided by the present application, wherein the computer-readable instruction, when executed by the one or more processors, implements the steps of the method for controlling the magnetic-disk loading according to any one of the above embodiments.

The details of one or more embodiments of the present application are proposed in the following drawings and description. The other characteristics and advantages of the present application may become apparent from the description, the drawings and the claims.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to the provided figures without paying creative work.

DETAILED DESCRIPTION

Figure 1:
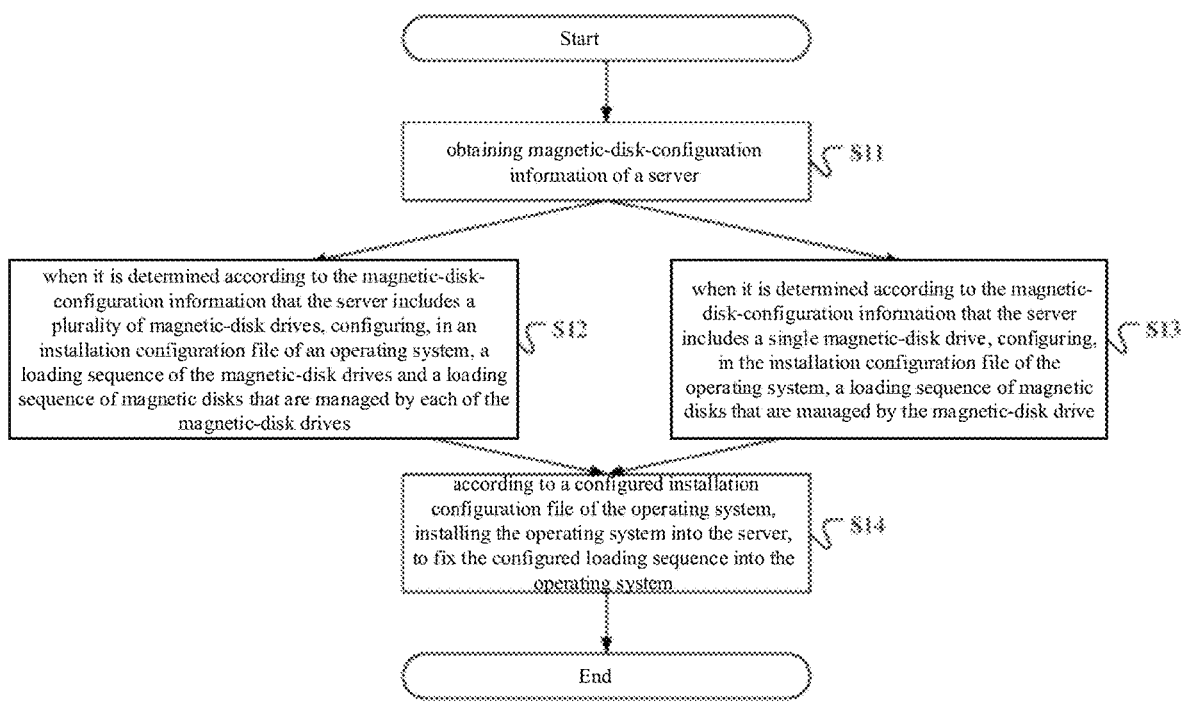
FIG. 1 is a flow chart of a method for controlling magnetic-disk loading according to one or more embodiments of the present application.

In the operation and maintenance management of servers, each time the operating system is restarted, the names of the magnetic-disk devices might change. That is because the sequence of the loading of the magnetic-disk drives and the sequence of the scanning of the magnetic disk are not constant. Such phenomenon of magnetic-disk out-of-order is deemed as a normal phenomenon in Linux, and the Linux does not have a constant drive loading sequence. For the Linux, the initialization of the magnetic-disk devices is a parallel and asynchronous process. Usually, the magnetic disks are sequentially initialized according to the sequence that the magnetic disks are identified. However, the naming of the drive letters (for example, sda) is decided by the sequence that the loading of the drives firstly completes and responds. In the operations such as the restarting of a computer, the hot plugging of the device and re-identification after resetting, the drive letters might change, and the corresponding relation between the drive letters and the physical slots of the device cannot be predicted at all.

The problem of the magnetic-disk out-of-order does not only exist in Red Hat Enterprise Linux (RHEL, a Linux operating system issued by the Red Hat company with focusing on the enterprise users)/community enterprise operating system (CentOS, which is one of the Linux release versions and comes from that Red Hat Enterprise Linux compiles the source code released in accordance with the Open Source Code Regulation), but also, in fact, exists in all of the Linux versions. Regarding the magnetic-disk devices with the interface of small computer system interface (SCSI), the process of scanning and allocating the drive letters does not only depend on the response of the SCSI instructions such as INQUIRY (a SCSI instruction inquiring the basic information of the storage devices, for example, the manufacturer, the product name and the product version and so on) and TEST_NIT_EADY (when no other SCSI instruction is operated, the computer side sends this command at regular intervals to detect whether the storage device still exists (similar to the heartbeat signal)), but is also influenced by the quantity of the processes operating in the system during that duration, the quantity of the operator threads of udev (which is the device manager of Linux kernel, whose main function is to manage the device nodes in the /dev directory, the quantity of the other peripheral devices connected to the computer, and the central processing unit (CPU) periods that are spent on initializing those peripheral component interconnect (PCI, or referred to as personal computer interface) devices. It also relies on the quantity of the CPU cores available in the server, the internal-memory size and so on. Those factors might cause small variation of the durations required by the initialization of the devices. Therefore, different "/dev/sdx" device names might be obtained, which is also referred to as magnetic-disk out-of-order.

When the system has merely one onboard magnetic-disk device, the Linux system identifies it as /dev/sda, and the sda is the magnetic-disk device where the Linux operating system is located. When a magnetic-disk device that is connected to an expanded redundant arrays of independent disks (Raid)/serial attached SCSI (SAS) card and so on is added, although it is desired that the newly added magnetic-disk device is identified as /dev/sdb at the starting-up of the system and used as a data disk: in fact, it is found in a test of multiple times of system restarting that the onboard magnetic-disk devices are sometimes identified as sda and sometimes identified as sdb, and the allocation of the drive letters of the two magnetic-disk devices is frequently in disorder. When the Raid/SAS card is connected to a plurality of magnetic disks internally, when the onboard magnetic disk is the sda, the system identifies the magnetic disks inside the Raid/SAS as sdb/sdc/sdd/sde . . . and so on. Moreover, the sequence of the magnetic disks of sdb/sdc/sdd/sde . . . belongs to the magnetic-disk out-of-order inside the same magnetic-disk drive. For the mixed use of the onboard magnetic disks and the Raid/SAS card devices, it is the out-of-order of the magnetic-disk devices of two different magnetic-disk drive modules.

In the Linux, the magnetic-disk out-of-order is deemed as a normal phenomenon. It is not a defect, but is what Linux is designed to be. The device names (the drive letters) are not originally designed to correspond to the physical positions or the sequence of the magnetic disks one to one, and the devices may be distinguished by using the unique identifying attributes that are provided by the devices or the data themselves, for example, world wide names (WWN, the globally unique identifier of a computer device) and universally unique identifiers (UUIDs). However, those identifiers, from the perspective of the system maintainers, are a string of unordered letters or digits, and cannot be used to conveniently and quickly identify the magnetic disks.

In addition, an udev rule may also be used to make an alias of a unique indexing identifier of the devices such as SERIAL_ID (a magnetic-disk serial number defined by the magnetic-disk manufacturers) in the attributes of the magnetic disks. However, that is not to modify the device names of the magnetic disks, but is to add an alias based on that the device names of the magnetic disks allocated by kernel (a real-time operating system) are not changed. In fact, the phenomenon of the magnetic-disk out-of-order still exists, merely "not out-of-order" device names are provided by the operating system as an avoiding means, but the problem of the magnetic-disk out-of-order is not effectively solved.

In the case in which a plurality of magnetic-disk drives are loaded, when the problem of the magnetic-disk out-of-order occurs in the operation and the maintenance of the operating system of the server, by using a method of excluding the magnetic-disk drive module from initramfs, by configuring dracut (an utility program maintaining the initramfs), the magnetic-disk drive that is required to be loaded in a delaying mode may be ignored, so that the magnetic-disk drive module that still exists in the initramfs obtains a prior device name (for example, sda). The initramfs is a package file in the format of cpio (a tool program used to establish and restore backup files) that is compressed. When the kernel starts up, the files is firstly decompressed from the package file to the internal-memory root file system of the kernel, and some necessary device drivers are loaded, the kernel is guided to start up. For example, when the problem of the magnetic-disk out-of-order is found, by modifying the initramfs of the operating system, the driving mpt3sas.ko of a SAS card is removed from the initramfs file, and after the initialization of the driving ahci.ko of the onboard magnetic disk in the initramfs is completed and the drive letter sda is obtained, the mpt3sas.ko drive is subsequently loaded in the subsequently starting-up kernel to obtain the drive letter sdb, to achieve the goal of delaying the time of the initialization of the SAS card device and preventing magnetic-disk out-of-order. However, such a mode is a solution for treatment after the operating system is used and the problem of the magnetic-disk out-of-order occurs, and the problem of the magnetic-disk out-of-order cannot be solved.

All of the above-described solutions for magnetic-disk out-of-order are solutions after the problem of the magnetic-disk out-of-order has already happened in a completely installed operating system, and cannot effectively solve the problem of the magnetic-disk out-of-order.

Accordingly, a method for controlling magnetic-disk loading, an apparatus, a device and a readable storage medium are provided by the present application, which are used to prevent the magnetic-disk out-of-order in the installation of the operating system, thereby the problem of the magnetic-disk out-of-order is effectively solved.

The technical solutions of the embodiments of the present application will be clearly and completely described below in combination with the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Referring to FIG. 1. FIG. 1 shows a flow chart of a method for controlling magnetic-disk loading according to an embodiment of the present application. The method for controlling the magnetic-disk loading provided by the embodiment of the present application may include:

S11: obtaining magnetic-disk-configuration information of a server.

In the present application, the magnetic-disk-configuration information of the server may be obtained before the installation of the operating system into the server. The magnetic-disk-configuration information mentioned herein may include the relevant information such as the types of the magnetic disks included by the server and the quantity of magnetic disks corresponding to each of the types of the magnetic disks, so as to obtain the magnetic-disk configuration condition of the server according to the magnetic-disk-configuration information.

It should be noted that, in the present application, the installation of the operating system in the server may be performed in the mode of preboot execution environment (PXE). The installation of the operating system may be performed with the help of a PXE server.

S12: when it is determined according to the magnetic-disk-configuration information that the server includes a plurality of magnetic-disk drives, configuring, in an installation configuration file of an operating system, a loading sequence of the magnetic-disk drives and a loading sequence of magnetic disks that are managed by each of the magnetic-disk drives.

After the magnetic-disk-configuration information of the server is obtained, the quantity of the magnetic-disk drives included by the server may be determined according to the magnetic-disk-configuration information. For example, when, according to the magnetic-disk-configuration information, it is determined that the server includes any one of the two cases of A: one onboard magnetic disk+one or more Raid/SAS cards, and B: a plurality of onboard magnetic disks+a plurality of Raid/SAS cards, then it is determined that the server includes a plurality of magnetic-disk drives.

In response to that it is determined that the server includes a plurality of magnetic-disk drives, the loading sequence of the plurality of magnetic-disk drives is configured in the installation configuration file of the operating system, and the loading sequence of the magnetic disks that are managed by each of the magnetic-disk drives is configured in the installation configuration file of the operating system, so that the magnetic-disk drives in the server and the magnetic disks that are managed by each of the magnetic-disk drives may be loaded according to the configured loading sequences after the installation of the operating system is completed and each time it is restarted, to prevent the problem of the magnetic-disk out-of-order.

The installation configuration file of the operating system refers to the configuration file that the operating system uses in the process of the installation. By configuring, in the configuration file of the operating system, the loading sequence of the magnetic-disk drives and the loading sequence of the magnetic disks that are managed by each of the magnetic-disk drives, the configured loading sequence may be fixed into the installed operating system, thereby the problem of the magnetic-disk out-of-order of the completely installed operating system is prevented.

S13: when it is determined according to the magnetic-disk-configuration information that the server includes a single magnetic-disk drive, configuring, in the installation configuration file of the operating system, a loading sequence of magnetic disks that are managed by the magnetic-disk drive.

When, according to the magnetic-disk-configuration information, it is determined that the server includes any one of the two cases of C: one Raid/SAS card connected to a plurality of magnetic disks, and D: a plurality of onboard magnetic disks or a plurality of Raid cards/SAS cards of the same model, then it is determined that the server includes a single magnetic-disk drive.

In response to that it is determined that the server includes a single magnetic-disk drive, the loading sequence of the magnetic disks that are managed by the magnetic-disk drive is configured in the installation configuration file of the operating system, so that, when the operating system is installed according to the installation configuration file of the operating system, the configured loading sequence of the magnetic disks may be fixed into the installed operating system, thereby the problem of the magnetic-disk out-of-order of the completely installed operating system is prevented.

S14: according to a configured installation configuration file of the operating system, installing the operating system into the server, to fix the configured loading sequence into the operating system.

After the loading sequence is completely configured in the installation configuration file of the operating system, the operating system may be installed in the server according to the configured installation configuration file of the operating system, so that the configured loading sequence may be fixed into the installed operating system. Therefore, each time the installed operating system is restarted, the magnetic-disk drives and the magnetic disks may be loaded according to the configured loading sequences, so that the drive letters that are allocated to the magnetic disks are constant, the problem of the magnetic-disk out-of-order during the usage of the operating system is prevented, and the problem needed to be solved of the magnetic-disk out-of-order during the usage of the server is prevented, thereby the experience of the user using the server is improved, and the product competitiveness is improved.

It may be known from the above process that the present application realizes the prevention of the magnetic-disk out-of-order in the installation of the operating system, so that during the usage of the operating system all of the magnetic-disk drives and the magnetic disks may be loaded according to the loading sequences configured previously, thereby the problem of the magnetic-disk out-of-order is effectively solved.

In the above technical solutions disclosed by the present application, by obtaining the magnetic-disk-configuration information of the server, when it is determined according to the magnetic-disk-configuration information that the server includes a plurality of magnetic-disk drives, the loading sequence of the magnetic-disk drives and the loading sequence of the magnetic disks that are managed by each of the magnetic-disk drives are configured in the installation configuration file of the operating system, and when it is determined according to the magnetic-disk-configuration information that the server includes a single magnetic-disk drive, the loading sequence of the magnetic disks that are managed by the magnetic-disk drive is configured in the installation configuration file of the operating system, so that when the operating system is installed according to a configured installation configuration file of the operating system, the configured loading sequences may fixed into the operating system, so that, each time the operating system is restarted, all of the magnetic-disk drives and the magnetic disks in the server may be loaded according to the configured loading sequences, thereby the problem of the magnetic-disk out-of-order is effectively solved. In other words, in the present application, the configuring of the loading sequences of the magnetic-disk drives and the magnetic disks in the installation of the operating system is realized, so that the prevention in advance of the phenomenon of the magnetic-disk out-of-order is realized, thereby the user experience is improved.

In the method for controlling the magnetic-disk loading according to the embodiments of the present application, the step of configuring, in the installation configuration file of the operating system, the loading sequence of the magnetic-disk drives and the loading sequence of the magnetic disks that are managed by each of the magnetic-disk drives may include:

configuring, in a kickstart configuration file, the loading sequence of the magnetic-disk drives and the loading sequence of the magnetic disks that are managed by each of the magnetic-disk drives; and the step of configuring, in the installation configuration file of the operating system, the loading sequence of the magnetic disks that are managed by the magnetic-disk drive may include:

configuring, in the kickstart configuration file, the loading sequence of the magnetic disks that are managed by the magnetic-disk drive.

In the present application, in response to that it is determined that the server includes a plurality of magnetic-disk drives, the loading sequence of the magnetic-disk drives and the loading sequence of the magnetic disks that are managed by each of the magnetic-disk drives may be configured in a kickstart configuration file at a the PXE server side. In response to that it is determined that the server includes a single magnetic-disk drive, the loading sequence of the magnetic disks that are managed by the magnetic-disk drive may be configured in a kickstart configuration file. The kickstart configuration file is an automated installation-script configuration file, and the kickstart configuration file is an automatic response file in the process of the installation of the operating system. By using the kickstart, a file may be created, and the file contains the answers to the problems that are encountered in a typical installation process.

By configuring the loading sequences in the kickstart configuration file, the configured loading sequences may be excellently fixed into the operating system, so that the problem of the magnetic-disk out-of-order of the completely installed operating system is excellently prevented, thereby the trouble caused by the magnetic-disk maintenance is solved.

Figure 2:
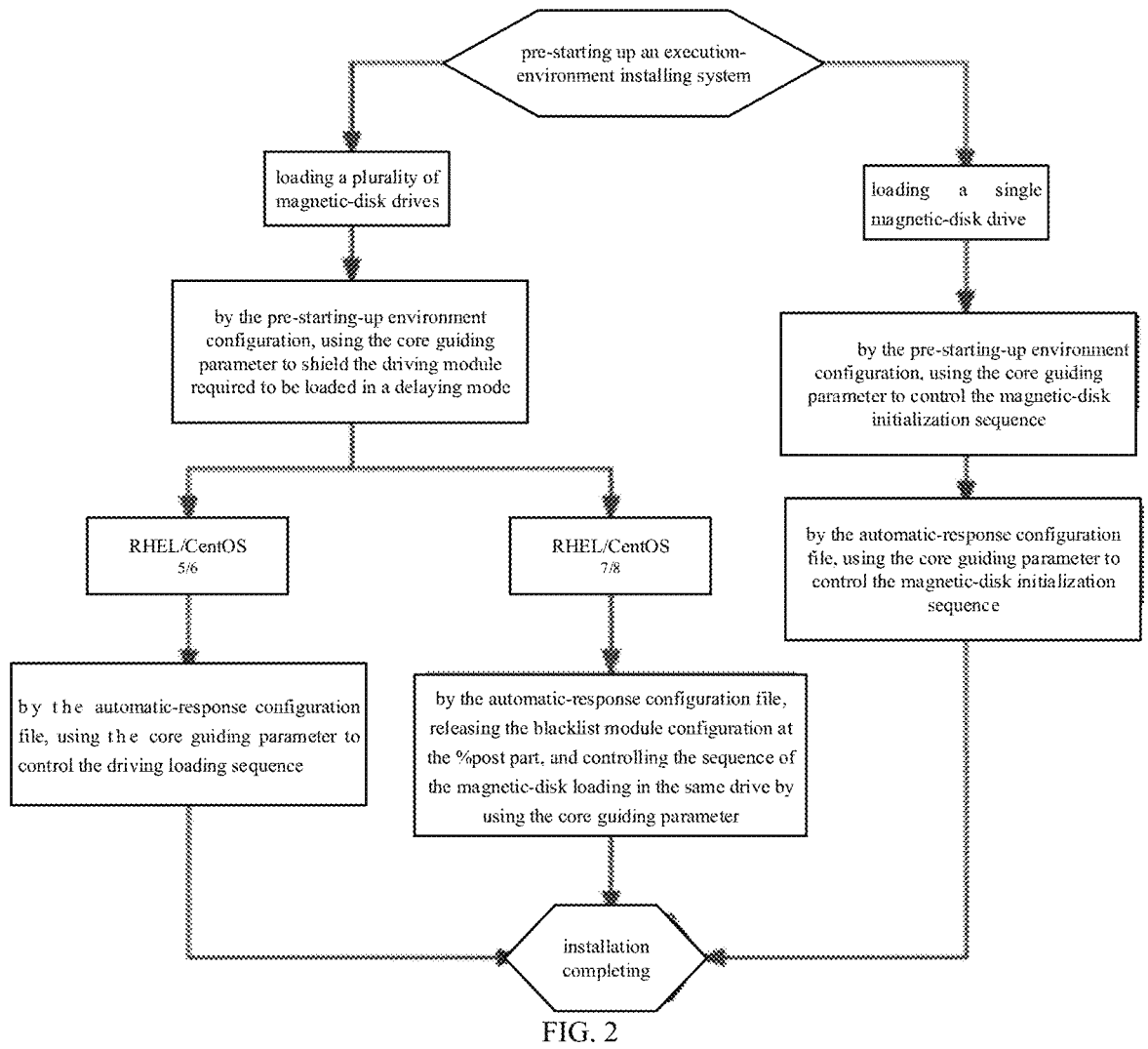
FIG. 2 is a flow chart of another method for controlling magnetic-disk loading according to one or more embodiments of the present application.

Referring to FIG. 2. FIG. 2 shows a flow chart of another method for controlling magnetic-disk loading according to an embodiment of the present application. In the method for controlling the magnetic-disk loading according to the embodiments of the present application, before the step of configuring, in the kickstart configuration file, the loading sequence, the method may further include:

when it is determined according to the magnetic-disk-configuration information that the server includes the plurality of magnetic-disk drives, configuring, in a default configuration file, the loading sequence of the magnetic-disk drives and the loading sequence of the magnetic disks that are managed by each of the magnetic-disk drives; or when it is determined according to the magnetic-disk-configuration information that the server includes the single magnetic-disk drive, configuring, in the default configuration file, the loading sequence of the magnetic disks that are managed by the magnetic-disk drive.

In the present application, in response to that it is determined according to the magnetic-disk-configuration information that the server includes the plurality of magnetic-disk drives, before the step of configuring, in the kickstart configuration file, the loading sequence of the magnetic-disk drives and the loading sequence of the magnetic disks that are managed by each of the magnetic-disk drives, the method may further include configuring, in the default configuration file, the loading sequence of the magnetic-disk drives and the loading sequence of the magnetic disks that are managed by each of the magnetic-disk drives. In addition, in response to that it is determined according to the magnetic-disk-configuration information that the server includes the single magnetic-disk drive, before the step of configuring, in the kickstart configuration file, the loading sequence of the magnetic disks that are managed by the magnetic-disk drive, the method may further include configuring, in the default configuration file, the loading sequence of the magnetic disks that are managed by the magnetic-disk drive.

The default configuration file is a file configured by the PXE; in other words, in the present application, the configuring of the loading sequences is performed in the default file at the PXE server side. By configuring the loading sequences in the default configuration file, it may be prevented that, during the process of the installation of the operating system, because of the problem of the magnetic-disk out-of-order, the operating system is installed into a magnetic disk that is not required, so that the reliability and the accuracy of the installation of the operating system are improved.

In the method for controlling the magnetic-disk loading according to the embodiments of the present application, the step of configuring, in the default configuration file, the loading sequence of the magnetic-disk drives and the loading sequence of the magnetic disks that are managed by each of the magnetic-disk drives may include:

controlling, in the default configuration file, by using a modprobe, blacklist parameter, the magnetic-disk drive that is loaded in a delaying mode, and controlling, by using scsi_mod.scan=sync, the loading sequence of the magnetic disks that are managed by a same magnetic-disk drive; and the step of configuring, in the default configuration file, the loading sequence of the magnetic disks that are managed by the magnetic-disk drive may include:

controlling, in the default configuration file, by using the scsi_mod.scan=sync, the loading sequence of the magnetic disks that are managed by the magnetic-disk drive.

In the present application, when the loading sequence of the magnetic-disk drives and the loading sequence of the magnetic disks that are managed by each of the magnetic-disk drives are configured in the default configuration file, a magnetic-disk drive that is loaded in a delaying mode may be configured in the default configuration file by using the core guiding parameter "modprobe.blacklist". In other words, by using that parameter, during the process of the installation of the operating system, for an initramfs internal-memory system that is loaded in the installation of the operating system, the drive that is required to be loaded in a delaying mode is shielded, and merely the magnetic-disk drive where the system is required to be installed is maintained. By assigning values to the modprobe.blacklist parameter to delay the loading of the magnetic-disk drive, the controlling over the magnetic-disk drive that is loaded in a delaying mode is realized, so that the magnetic-disk drive may be loaded in a delaying mode. In addition, the loading sequence of the magnetic disks that are managed by the same magnetic-disk drive may be controlled in the default configuration file by using the core guiding parameter "scsi_mod.scan=sync", to ensure that the operating system may be installed into the specified magnetic disk.

It should be noted that, as the default, in order to ensure the starting-up speed of the operating system, the Linux system uses the asynchronous parallelism (async) mode to scan the SCSI device, the core guiding parameter "scsi_mod.scan=sync" modifies it into the synchronous serialization (sync) mode, and the operating system, at starting-up, enumerates and sequentially scans the SCSI devices according to the PCI bus numbers, so that the magnetic disks are allocated the drive letters according to the sequence of the enumeration and loading of the PCI buses.

In addition, when the loading sequence of the magnetic disks that are managed by the magnetic-disk drive is configured in the default configuration file, then the loading sequence of the magnetic disks that are managed by the same magnetic-disk drive is controlled in the default configuration file by using the core guiding parameter "scsi_mod.scan=sync", to ensure that the operating system may be installed into the specified magnetic disk.

In the method for controlling the magnetic-disk loading according to the embodiments of the present application, the step of configuring, in the kickstart configuration file, the loading sequence of the magnetic-disk drives and the loading sequence of the magnetic disks that are managed by each of the magnetic-disk drives may include:

when the operating system uses an upstart starting-up manager, controlling, in the kickstart configuration file, by using a rdloaddriver parameter, the loading sequence of the magnetic-disk drives, and controlling, by using the scsi_mod.scan=sync, the loading sequence of the magnetic disks that are managed by the same magnetic-disk drive.

In the present application, when the loading sequence of the magnetic-disk drives and the loading sequence of the magnetic disks that are managed by each of the magnetic-disk drives are configured in the kickstart configuration file, for operating systems of older versions using the upstart starting-up manager, for example, the RHEL/CentOS of versions 5 and 6, taking into consideration that the process of controlling the magnetic-disk drive that is loaded in a delaying mode in the default configuration file by using the modprobe, blacklist parameter cannot continue to the installation of the kickstart configuration file and the above-described operating systems using the upstart starting-up manager, the loading sequence of the magnetic-disk drives may be controlled in the kickstart configuration file by using the core guiding parameter "rdloaddriver", so as to fix the loading sequence of the magnetic-disk drives into the operating system, so that each time the operating system is started up, all of the magnetic-disk drives may be loaded sequentially according to the configured rdloaddriver parameter. In addition, the loading sequence of the magnetic disks that are managed by the same magnetic-disk drive is controlled in the kickstart configuration file by using the core guiding parameter "scsi_mod.scan=sync", thereby that the loading sequence of the magnetic disks is always the same as the sequence of the initialization of the PCI buses in the installed operating system is ensured to ensure the constancy of the sequence of the initialization of the magnetic disks.

In the method for controlling the magnetic-disk loading according to the embodiments of the present application, after the step of, according to the configured installation configuration file of the operating system, installing the operating system into the server, the method may further include:

when the operating system uses a systemd starting-up manager, adding into a % post part of the kickstart configuration file a removing instruction of removing the magnetic-disk drive that is loaded in a delaying mode that is disposed in the default configuration file.

In the present application, for the operating systems of newer versions using the systemd starting-up manager, for example, the RHEL/CentOS of versions 7 and 8, because the process of controlling the magnetic-disk drive that is loaded in a delaying mode in the default configuration file by using the modprobe, blacklist parameter may continue to the installation of the kickstart configuration file and the above-described operating systems using the systemd starting-up manager, in order to prevent that the /etc/modprobe.d/anaconda-blacklist.conf file of the completely installed operating system still shields the magnetic-disk drive that is loaded in the delaying mode, after the operating system is installed in the server according to the configured installation configuration file of the operating system and before the operating system is restarted, a removing instruction of removing the magnetic-disk drive that is loaded in a delaying mode that is disposed in the default configuration file is added into a % post part of the kickstart configuration file from the initramfs, thereby that the completely installed operating system may identify the magnetic-disk drive that is loaded in the delaying mode is ensured, so that the magnetic-disk drive that is loaded in the delaying mode may be smoothly and normally loaded in the delaying mode.

It should be noted that, for the operating systems of newer versions using the systemd starting-up manager, when the loading sequence of the magnetic disks that are managed by each of the magnetic-disk drives are configured in the kickstart configuration file, the loading sequence of the magnetic disks that are managed by the same magnetic-disk drive is controlled in the kickstart configuration file by using the core guiding parameter "scsi_mod.scan=sync", thereby that the loading sequence of the magnetic disks in the installed operating system is always the same as the sequence of the initialization of the PCI buses is ensured to ensure the constancy of the sequence of the initialization of the magnetic disks.

In the method for controlling the magnetic-disk loading according to the embodiments of the present application, the step of configuring, in the kickstart configuration file, the loading sequence of the magnetic disks that are managed by the magnetic-disk drive may include:

controlling, in the kickstart configuration file, by using the scsi_mod.scan=sync, the loading sequence of the magnetic disks that are managed by the magnetic-disk drive.

In the present application, when the loading sequence of the magnetic disks that are managed by the magnetic-disk drive is configured in the kickstart configuration file, the loading sequence of the magnetic disks that are managed by the magnetic-disk drive is controlled in the kickstart configuration file by using the core guiding parameter "scsi_mod.scan=sync", thereby that the loading sequence of the magnetic disks is always the same as the sequence of the initialization of the PCI buses is ensured in the installed operating system to ensure the constancy of the sequence of the initialization of the magnetic disks.

In order to more clearly describe the above solutions of the present application, it is assumed that the current drive of the onboard magnetic disks of the server is ahci.ko, and the Raid-card drive is megaraid_sas.ko, it is required to install the operating system preferentially into the onboard magnetic disk that comes first in the enumeration sequence of the PCI buses, and that magnetic disk is required to be identified as sda in the completely installed operating system. Accordingly:

1. When the operating system is installed in the mode of PXE, for the different magnetic-disk configurations of the server, the following cases of a plurality of magnetic-disk drives and a single magnetic-disk drive should be distinguished:

A. One onboard magnetic disk+ one or more Raid/SAS cards

B. A plurality of onboard magnetic disks and a plurality of Raid/SAS cards

C. One Raid/SAS card connected to a plurality of magnetic disks

D. A plurality of onboard magnetic disks or a plurality of Raid/SAS cards of the same model 2. For the cases A and B in which a plurality of magnetic-disk drives are loaded, the core guiding parameter "modprobe.blacklist=megaraid_sas" is used in the default configuration file at the PXE server side. During the process of the installation of the operating system, for an initramfs internal-memory system that is loaded in the installation of the operating system, the drive megaraid_sas.ko that is required to be loaded in a delaying mode is shielded: in other words, merely the magnetic-disk drive ahci.ko where the system is required to be installed is maintained. Furthermore, the sequence of the plurality of magnetic disks that are controlled by the same magnetic-disk drive is controlled by using the core guiding parameter "scsi_mod.scan=sync", to ensure that the system may be installed into the specified magnetic disk.

3. For the operating systems of older versions using the upstart starting-up manager, for example, the RHEL/CentOS of versions 5 and 6, in the kickstart configuration file at the PXE server side, the sequence of the loading of the drives is controlled by using the core guiding parameter "rdload-driver-ahci,megaraid_sas", and the sequence of the plurality of magnetic disks corresponding to the same drive is controlled by using the core guiding parameter "scsi_mod.scan=sync", thereby that the loading sequence in the installed system of the magnetic disks is the same as the enumeration sequence of the initialization of the PCI buses is ensured.

4. For the operating systems of newer versions using the systemd starting-up manager, for example, the RHEL/CentOS of versions 7 and 8, in the kickstart configuration file at the PXE server side, when the installation of the % post part of the finally executed script is completed, the following instruction of removing the megaraid_sas drive from the initramfs that is configured by the core guiding parameter "modprobe.blacklist" in the step 2 is added, to prevent that the /etc/modprobe.d/anaconda-blacklist.conf file of the completely installed system shields the megaraid_sas drive again:

```
%post --interpreter=/bin/bash
sed    -i    "s/blacklist    megaraid_sas/#blacklist    megaraid_sas/g"
/etc/modprobe.d/anaconda-blacklist.conf
    mv -f /boot/initramfs-$(uname -r).img /boot/initramfs-$(uname -r)-old.img
    dracut --omit-drivers "megaraid_sas" /boot/initramfs-$(uname -r).img $ (uname -r)
%end
```

At the same time, the sequence of the plurality of magnetic disks corresponding to the same magnetic-disk drive is controlled by using the core guiding parameter "scsi_mod.scan=sync", thereby that the loading sequence of the magnetic disks in the installed system is the same as the enumeration sequence of the initialization of the PCI buses is ensured.

5. For the cases C and D in which a single magnetic-disk drive is loaded, in the default configuration file at the PXE server side, the sequence of the plurality of magnetic disks corresponding to the same drive is controlled by using the core guiding parameter "scsi_mod.scan=sync" to ensure that the system may be installed into the specified magnetic disk.

6. In the kickstart configuration file at the PXE server side, the sequence of the plurality of magnetic disks corresponding to the same drive is controlled by using the core guiding parameter "scsi_mod.scan=sync", thereby that the loading sequence of the magnetic disks in the installed operating system is the same as the enumeration sequence of the initialization of the PCI buses is ensured.

7. The installed operating system, according to the different magnetic-disk configurations, is provided with preset magnetic-disk-drive controlling parameters, and the problem of out-of-order in the system is prevented.

Figure 3:
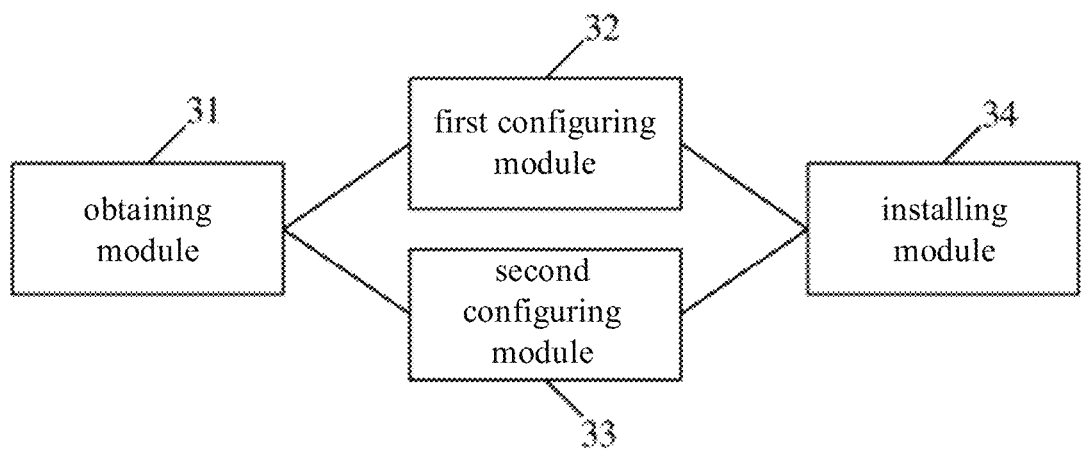
FIG. 3 is a schematic diagram of a structure of an apparatus for controlling magnetic-disk loading according to one or more embodiments of the present application.

An apparatus for controlling magnetic-disk loading is further provided by the embodiment of the present application. Referring to FIG. 3. FIG. 3 shows a schematic diagram of a structure of an apparatus for controlling magnetic-disk loading according to an embodiment of the present application. The apparatus may include:

an obtaining module 31 configured for obtaining magnetic-disk-configuration information of a server;

a first configuring module 32 configured for, when it is determined according to the magnetic-disk-configuration information that the server includes a plurality of magnetic-disk drives, configuring, in an installation configuration file of an operating system, a loading sequence of the magnetic-disk drives and a loading sequence of magnetic disks that are managed by each of the magnetic-disk drives;

a second configuring module 33 configured for, when it is determined according to the magnetic-disk-configuration information that the server includes a single magnetic-disk drive, configuring, in the installation configuration file of the operating system, a loading sequence of magnetic disks that are managed by the magnetic-disk drive; and an installing module 34 configured for, according to a configured installation configuration file of the operating system, installing the operating system into the server, to fix the configured loading sequence into the operating system.

In the apparatus for controlling the magnetic-disk loading according to the embodiments of the present application, the first configuring module 32 may include:

a first configuring unit configured for configuring, in a kickstart configuration file, the loading sequence of the magnetic-disk drives and the loading sequence of the magnetic disks that are managed by each of the magnetic-disk drives; and the second configuring module may include:

a second configuring unit configured for configuring, in the kickstart configuration file, the loading sequence of the magnetic disks that are managed by the magnetic-disk drive.

The apparatus for controlling the magnetic-disk loading according to the embodiments of the present application may further include:

a third configuring unit configured for, when it is determined according to the magnetic-disk-configuration information that the server includes the plurality of magnetic-disk drives, before the step of configuring, in the kickstart configuration file, the loading sequence of the magnetic-disk drives and the loading sequence of the magnetic disks that are managed by each of the magnetic-disk drives, configuring, in a default configuration file, the loading sequence of the magnetic-disk drives and the loading sequence of the magnetic disks that are managed by each of the magnetic-disk drives; or a fourth configuring unit configured for, when it is determined according to the magnetic-disk-configuration information that the server includes a single magnetic-disk drive, before the step of configuring, in the kickstart configuration file, the loading sequence of the magnetic disks that are managed by the magnetic-disk drive, configuring, in the default configuration file, the loading sequence of the magnetic disks that are managed by the magnetic-disk drive.

In the apparatus for controlling the magnetic-disk loading according to the embodiments of the present application, the third configuring unit may include:

a first configuring subunit configured for controlling, in the default configuration file, by using a modprobe, blacklist parameter, the magnetic-disk drive that is loaded in a delaying mode, and controlling, by using the scsi_mod.scan=sync, the loading sequence of the magnetic disks that are managed by a same magnetic-disk drive; and the fourth configuring unit may include:

a second configuring subunit configured for controlling, in the default configuration file, by using the scsi_mod.scan=sync, the loading sequence of the magnetic disks that are managed by the magnetic-disk drive.

In the apparatus for controlling the magnetic-disk loading according to the embodiments of the present application, the first configuring unit may include:

a third configuring subunit configured for, when the operating system uses an upstart starting-up manager, controlling, in the kickstart configuration file, by using a rdloaddriver parameter, the loading sequence of the magnetic-disk drives, and controlling, by using the scsi_mod.scan=sync, the loading sequence of the magnetic disks that are managed by the same magnetic-disk drive.

In the apparatus for controlling magnetic-disk loading according to the embodiments of the present application, the first configuring unit may further include:

an adding subunit configured for, after the step of, according to the configured installation configuration file of the operating system, installing the operating system into the server, when the operating system uses a systemd starting-up manager, adding into a % post part of the kickstart configuration file a removing instruction of removing the magnetic-disk drive that is loaded in the delaying mode that is disposed in the default configuration file.

In the apparatus for controlling the magnetic-disk loading according to the embodiments of the present application, the second configuring unit may include:

a fourth configuring subunit configured for controlling, in the kickstart configuration file, by using the scsi_mod.scan=sync, the loading sequence of the magnetic disks that are managed by the magnetic-disk drive.

Figure 4:
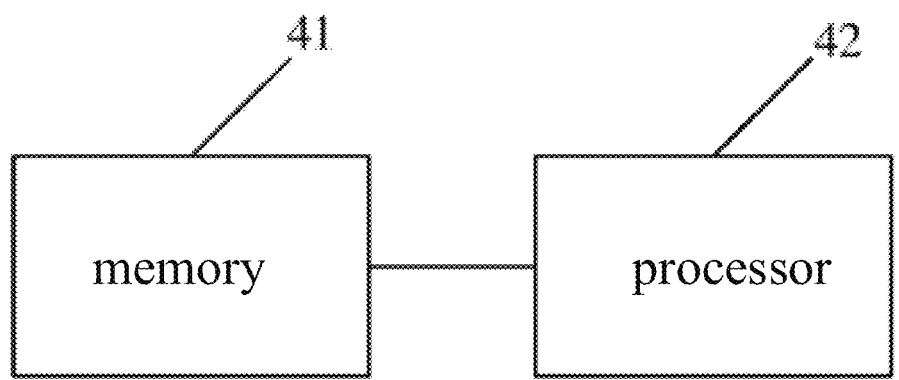
FIG. 4 is a schematic diagram of a structure of a device for controlling magnetic-disk loading according to one or more embodiments of the present application.

A device for controlling magnetic-disk loading is further provided by an embodiment of the present application. Referring to FIG. 4. FIG. 4 shows a schematic diagram of a structure of a device for controlling magnetic-disk loading according to an embodiment of the present application. The device may include:

a memory 41 configured for storing a computer-readable instruction; and one or more processors 42 configured for, when executing the computer-readable instruction stored in the memory 41, implementing the steps of the method for controlling the magnetic-disk loading according to any one of the above embodiments.

One or more non-volatile computer-readable storage mediums storing a computer-readable instruction are further provided by an embodiment of the present application, wherein the computer-readable instruction, when executed by the one or more processors, causes the one or more processors to implement the steps of the method for controlling the magnetic-disk loading according to any one of the above embodiments.

The readable storage medium includes various media that may store a program code, such as a USB flash disk, a mobile hard disk drive, a read-only memory (ROM), a random access memory (RAM), a diskette and an optical disk.

The description on the related part of the apparatus for controlling magnetic-disk loading, the device and the readable storage medium according to the present application may refer to the detailed description on the corresponding part in the method for controlling the magnetic-disk loading according to the embodiments of the present application, and is not discussed further herein.

It should be noted that, in the present text, relation terms such as first and second are merely intended to distinguish one entity or operation from another entity or operation, and that does not necessarily require or imply that there is any such actual relation or order between those entities or operations. Furthermore, the terms "include". "comprise" or any variants thereof are intended to cover non-exclusive inclusions, so that processes, methods, articles or devices that include a series of elements include the inherent elements. Unless further limitation is set forth, an element defined by the wording "including a . . . " does not exclude additional same element in the process, method, article or device including the element. Furthermore, the parts of the above technical solutions according to the embodiments of the present application that have the same principles of implementation as those of the corresponding technical solutions in the prior art are not described in detail, to avoid excessively replicated description.

The above description on the disclosed embodiments enables a person skilled in the art may implement or use the present application. Various modifications on those embodiments will be apparent to a person skilled in the art, and the general principle defined herein may be implemented in other embodiments without departing from the spirit or scope of the present application. Therefore, the present application should not be limited to the embodiments illustrated herein, but should meet the broadest scope in accord with the principle and the novel characteristics disclosed herein.

The invention claimed is:

1. A method for controlling magnetic-disk loading, comprising:

obtaining magnetic-disk-configuration information of a server;

when it is determined according to the magnetic-disk-configuration information that the server comprises a plurality of magnetic-disk drives, configuring, in an installation configuration file of an operating system, a loading sequence of the magnetic-disk drives and a loading sequence of magnetic disks that are managed by each of the magnetic-disk drives; or when it is determined according to the magnetic-disk-configuration information that the server comprises a single magnetic-disk drive, configuring, in the installation configuration file of the operating system, a loading sequence of magnetic disks that are managed by the magnetic-disk drive; and according to a configured installation configuration file of the operating system, installing the operating system into the server, to fix the configured loading sequence into the operating system;

wherein the step of configuring, in the installation configuration file of the operating system, the loading sequence of the magnetic-disk drives and the loading sequence of the magnetic disks that are managed by each of the magnetic-disk drives comprises:

configuring, in a kickstart configuration file, the loading sequence of the magnetic-disk drives and the loading sequence of the magnetic disks that are managed by each of the magnetic-disk drives; and the step of configuring, in the installation configuration file of the operating system, the loading sequence of the magnetic disks that are managed by the magnetic-disk drive comprises:

configuring, in the kickstart configuration file, the loading sequence of the magnetic disks that are managed by the magnetic-disk drive; and wherein before the step of configuring, in the kickstart configuration file, the loading sequence, the method further comprises:

when it is determined according to the magnetic-disk-configuration information that the server comprises the plurality of magnetic-disk drives, configuring, in a default configuration file, the loading sequence of the magnetic-disk drives and the loading sequence of the magnetic disks that are managed by each of the magnetic-disk drives; or when it is determined according to the magnetic-disk-configuration information that the server comprises the single magnetic-disk drive, configuring, in the default configuration file, the loading sequence of the magnetic disks that are managed by the magnetic-disk drive.

2. The method for controlling the magnetic-disk loading according to claim 1, wherein the step of configuring, in the default configuration file, the loading sequence of the magnetic-disk drives and the loading sequence of the magnetic disks that are managed by each of the magnetic-disk drives comprises:

controlling, in the default configuration file, by using a modprobe.blacklist parameter, the magnetic-disk drive that is loaded in a delaying mode, and controlling, by using scsi_mod.scan=sync, the loading sequence of the magnetic disks that are managed by a same magnetic-disk drive; and the step of configuring, in the default configuration file, the loading sequence of the magnetic disks that are managed by the magnetic-disk drive comprises:

controlling, in the default configuration file, by using the scsi_mod.scan=sync, the loading sequence of the magnetic disks that are managed by the magnetic-disk drive.

3. The method for controlling the magnetic-disk loading according to claim 2, wherein the step of configuring, in the kickstart configuration file, the loading sequence of the magnetic-disk drives and the loading sequence of the magnetic disks that are managed by each of the magnetic-disk drives comprises:

when the operating system uses an upstart starting-up manager, controlling, in the kickstart configuration file, by using a rdloaddriver parameter, the loading sequence of the magnetic-disk drives, and controlling, by using the scsi_mod.scan=sync, the loading sequence of the magnetic disks that are managed by the same magnetic-disk drive.

4. The method for controlling the magnetic-disk loading according to claim 2, wherein after the step of, according to the configured installation configuration file of the operating system, installing the operating system into the server, the method further comprises:

when the operating system uses a systemd starting-up manager, adding into a % post part of the kickstart configuration file a removing instruction of removing the magnetic-disk drive that is loaded in the delaying mode that is disposed in the default configuration file.

5. The method for controlling the magnetic-disk loading according to claim 2, wherein the step of configuring, in the kickstart configuration file, the loading sequence of the magnetic disks that are managed by the magnetic-disk drive comprises:

controlling, in the kickstart configuration file, by using the scsi_mod.scan=sync, the loading sequence of the magnetic disks that are managed by the magnetic-disk drive.

6. A device for controlling the magnetic-disk loading, comprising:

a memory configured for storing a computer-readable instruction; and one or more processors configured for, when executing the computer-readable instruction, implementing the steps of the method for controlling the magnetic-disk loading according to claim 1.

7. One or more non-transitory computer-readable storage mediums storing a computer-readable instruction, wherein the computer-readable instruction, when executed by the one or more processors, causes the one or more processors to implement the steps of the method according to claim 1.

8. The method for controlling the magnetic-disk loading according to claim 1, wherein the magnetic-disk-configuration information comprises: types of the magnetic disks and a quantity of the magnetic disks corresponding to each of the types of the magnetic disks.

9. The method for controlling the magnetic-disk loading according to claim 1, wherein after the step of obtaining the magnetic-disk-configuration information of the server, the method further comprises:

according to the magnetic-disk-configuration information, determining a quantity of the magnetic-disk drives.

10. The method for controlling the magnetic-disk loading according to claim 1, wherein the kickstart configuration file is an automatic response file in a process of installation of the operating system.

11. The device for controlling the magnetic-disk loading according to claim 6, wherein the operation of configuring, in the default configuration file, the loading sequence of the magnetic-disk drives and the loading sequence of the magnetic disks that are managed by each of the magnetic-disk drives comprises:

controlling, in the default configuration file, by using a modprobe.blacklist parameter, the magnetic-disk drive that is loaded in a delaying mode, and controlling, by using scsi_mod.scan=sync, the loading sequence of the magnetic disks that are managed by a same magnetic-disk drive; and the operation of configuring, in the default configuration file, the loading sequence of the magnetic disks that are managed by the magnetic-disk drive comprises:

controlling, in the default configuration file, by using the scsi_mod.scan=sync, the loading sequence of the magnetic disks that are managed by the magnetic-disk drive.

12. The device for controlling the magnetic-disk loading according to claim 11, wherein the operation of configuring, in the kickstart configuration file, the loading sequence of the magnetic-disk drives and the loading sequence of the magnetic disks that are managed by each of the magnetic-disk drives comprises:

when the operating system uses an upstart starting-up manager, controlling, in the kickstart configuration file, by using a rdloaddriver parameter, the loading sequence of the magnetic-disk drives, and controlling, by using the scsi_mod.scan=sync, the loading sequence of the magnetic disks that are managed by the same magnetic-disk drive.

13. The device for controlling the magnetic-disk loading according to claim 11, wherein after the operation of, according to the configured installation configuration file of the operating system, installing the operating system into the server, the method further comprises:

when the operating system uses a systemd starting-up manager, adding into a % post part of the kickstart configuration file a removing instruction of removing the magnetic-disk drive that is loaded in the delaying mode that is disposed in the default configuration file.

14. The device for controlling the magnetic-disk loading according to claim 11, wherein the operation of configuring, in the kickstart configuration file, the loading sequence of the magnetic disks that are managed by the magnetic-disk drive comprises:

controlling, in the kickstart configuration file, by using the scsi_mod.scan=sync, the loading sequence of the magnetic disks that are managed by the magnetic-disk drive.

15. The one or more non-transitory computer-readable storage mediums according to claim 7, wherein the operation of configuring, in the default configuration file, the loading sequence of the magnetic-disk drives and the loading sequence of the magnetic disks that are managed by each of the magnetic-disk drives comprises:

controlling, in the default configuration file, by using a modprobe.blacklist parameter, the magnetic-disk drive that is loaded in a delaying mode, and controlling, by using scsi_mod.scan=sync, the loading sequence of the magnetic disks that are managed by a same magnetic-disk drive; and the operation of configuring, in the default configuration file, the loading sequence of the magnetic disks that are managed by the magnetic-disk drive comprises:

controlling, in the default configuration file, by using the scsi_mod.scan=sync, the loading sequence of the magnetic disks that are managed by the magnetic-disk drive.

* * * * *